United States Patent [19]
Borghi et al.

[11] Patent Number: 5,617,016
[45] Date of Patent: Apr. 1, 1997

[54] BUCK CONVERTER WITH OPERATING MODE AUTOMATICALLY DETERMINED BY THE LOAD LEVEL

[75] Inventors: Maria R. Borghi, Marcallo con Casone; Paolo Sandri, Milan, both of Italy

[73] Assignee: SGS Microelectronics, S.r.l., Agrate Brianza, Italy

[21] Appl. No.: 326,504

[22] Filed: Oct. 20, 1994

[30] Foreign Application Priority Data

Oct. 22, 1993 [IT] Italy ................... VA93A0022

[51] Int. Cl.$^6$ ................................................ G05F 1/56
[52] U.S. Cl. ............................................ 323/284; 323/282
[58] Field of Search ..................... 323/222, 223, 323/282, 284; 363/21, 23, 25

[56] References Cited

U.S. PATENT DOCUMENTS

| | | |
|---|---|---|
| 4,866,367 | 9/1989 | Ridley et al. ................. 323/287 |
| 4,885,674 | 12/1989 | Varga et al. ................... 363/21 |
| 5,029,269 | 7/1991 | Elliott et al. ................. 323/284 |
| 5,247,239 | 9/1993 | Yamamura et al. ............. 323/272 |
| 5,475,296 | 12/1995 | Vinsant et al. ................ 323/284 |
| 5,477,132 | 12/1995 | Canter et al. ................. 323/282 |

FOREIGN PATENT DOCUMENTS

| | | |
|---|---|---|
| 421245 | 4/1991 | European Pat. Off. . |
| 446490 | 9/1991 | European Pat. Off. . |
| 447637 | 9/1991 | European Pat. Off. . |
| 473925 | 3/1992 | European Pat. Off. . |
| 559336 | 9/1993 | European Pat. Off. . |

*Primary Examiner*—Matthew V. Nguyen
*Attorney, Agent, or Firm*—David V. Carlson; Seed and Berry LLP

[57] ABSTRACT

A DC-to-DC (buck) converter comprises a PWM regulation loop and a hysteretic control loop, which are alternatively enabled by a mode selection circuit of the converter in function of the load level. When the level of load drops below a preset limit related to a design load level, the converter passes from a PWM control mode to a hysteretic control mode, thus eliminating switching losses during periods of operation at relatively low load level.

10 Claims, 7 Drawing Sheets

BUCK CONVERTER WITH OPERATING MODE AUTOMATICALLY DETERMINED BY THE LOAD LEVEL

CROSS-REFERENCE TO RELATED APPLICATION

This application claims priority from Italian app'n VA/93/A/0022, filed Oct. 22, 1993, which is hereby incorporated by reference.

BACKGROUND AND SUMMARY OF THE INVENTION

The present invention relates to a DC-to-DC converter provided with means for optimizing power consumption as the load level varies.

In static converters operating in a switching mode, conversion efficiency may be improved by reducing the conduction losses of the switch, given by the product between the internal resistance of the switching device and the current, plus the switching losses that are a function of the frequency and speed of the transitions. Normally a converter is designed for a certain level of switched current under normal steady state conditions of operation, by establishing on a case by case basis, the size of the power devices and the switching frequency and duty-cycle when operating in a steady state condition. Generally, for relatively high switched currents, conduction losses will be more relevant, while for relatively low switched currents, i.e., during periods of operation when the current level and duty-cycle of the converter are reduced, switching losses become more and more relevant.

Several techniques are known for reducing the switching frequency of the power switch when the load level decreases in order to increase the overall conversion efficiency of the system. The known solutions may be classified in two distinct categories:

a) The control circuit of the converter is completely switched-off with the exception of the circuits that handle the turn-off phase. The control circuit is reactivated when the output voltage drops below a preset minimum threshold and switched off again when the output voltage becomes higher than a preset maximum threshold.

b) The control system of the switch is maintained always active, but the switch is commanded to switch for brief bursts of high frequency pulses (burst mode). The duration of these bursts is established by the time necessary for the output voltage, once it has dropped below a minimum threshold, to rise back again above a maximum threshold.

Known approaches of the first category have the drawback that in case of integrated buck converters, where the power switch transistor may also be integrated, it is necessary to keep active the circuit that directly control the turn-on and the turn-off of the power transistor. This means that the limited saving that can be achieved may be negatively counterbalanced by an increased complexity of the circuit because special monitoring circuits of internal voltages must be introduced.

The approaches of the second category, though better adapted to situations where a solution of the first category is not useable, are still not very effective in terms of power saving. This is due to the fact that during periods of operation at a relatively low load level of the converter, switching losses persist during burst periods.

Therefore there is a need for a converter that would allow an optimization of its efficiency during periods of operation when the converter outputs a relatively low current, i.e., during periods of operation at a relatively low load level.

This objective is fully met by the converter of the present invention which is characterized by the ability to drive the power switch with a signal produced by a conventional PWM control network during operation at a relatively high load level and conversely with a signal produced by a hysteresis comparator, during operation at a relatively low load level.

The automatic selection of one or the other mode of operation of the converter is effected by logic circuitry capable of generating an enable/disable signal for the mutually exclusive control networks.

Monitoring of the load level of the converter is effected without employing dissipative sensing devices, but by comparing the duty-cycle of either one or the other of the two alternate driving signals with a reference value. In the case of the driving signal produced by the PWM control network, which is active during normal conditions of operation with a relatively high load of the converter, its current duty-cycle is compared with a signal representing a preset reference, or threshold, duty-cycle, which may be set between 30% and 50% of the designed steady state duty-cycle under normal operating condition of the converter.

In practice, the converter automatically passes from a "continuous" mode of operation, controlled by a conventional PWM control network, to a "discontinuous" mode of operation during which the turning-on and the turning-off of the power switch are controlled directly as a function of the output voltage in a hysteretic mode, without pulses synchronous with the clock signal of the circuit, or conversely, in dependence on the load level. This almost entirely eliminates the switching losses during operation of the converter at a low load level.

BRIEF DESCRIPTION OF THE DRAWING

The disclosed inventions will be described with reference to the accompanying drawings, which show important sample embodiments of the invention and which are incorporated in the specification hereof by reference, wherein.

The different aspects and advantages of the converter of the invention will become evident through the following description of several important embodiments, incorporated herein by express reference, and by referring to the attached drawings, wherein.

DETAILED DESCRIPTION OF THE PREFERRED EMBODIMENTS

Figures 1, 2, 3:
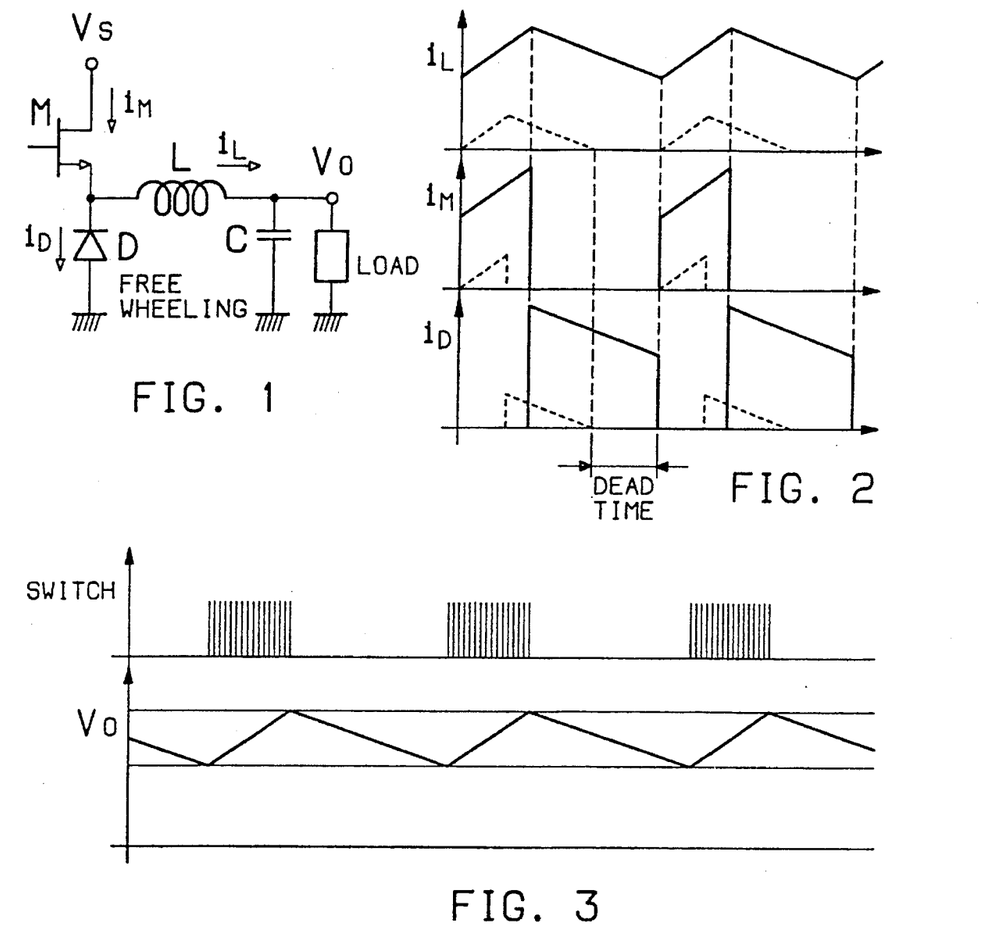
FIG. 1 shows a functional electrical power scheme of a common buck converter normally used in step-down systems, from a supply voltage Vs to a lower output voltage Vo.
FIG. 2 shows the respective wave forms of the currents for two different conditions of operation of the power converter circuit.
FIG. 3 shows an illustrative diagram of a burst-mode operation of a converter, during operation at low load, according to a known technique.

The numerous innovative teachings of the present application will be described with particular reference to the presently preferred embodiment by way of example, and not of limitation, in which:

With reference to FIG. 1, a static DC-DC converter that is widely used is the so-called buck converter, commonly used in systems where the voltage must be reduced from a unstabilized supply voltage Vs to a stabilized lower voltage Vo.

Of course the invention is useful and may be employed with advantages also in other types of DC-DC static converters, as will be evident to those of ordinary skill.

Reverting to the particular embodiment taken into consideration, the power structure of a buck converter is in a way extremely simple. It consists essentially of a power switch, for example a transistor M, capable of intermittently connecting a first terminal of an inductor L to the supply node Vs. The second terminal of the inductor L is connected to a terminal of an output capacitor C, which represents the output node Vo of the circuit. The circuit is completed by a flee-wheeling diode D.

The waveforms of the currents $i_L$, $i_M$ and $i_D$, which flow through the inductor L, the switch M and the diode D respectively, are depicted in the diagrams of FIG. 2.

The waveforms in a continuous mode of operation of the power circuit of the converter, that is with the inductor L always carrying a current are indicated with a solid line. The waveforms when the converter functions in a discontinuous mode are indicated with dashed lines. This happens when the current through the inductor L becomes null for a certain interval of the timing signal that establishes the switching frequency of the converter. This timing signal is normally fixed by a local oscillator or derived from a system clock. Of course, the output voltage Vo must be suitably stabilized under changing load conditions and supply voltage. This requirement is commonly satisfied by a PWM circuit or control network suitable to vary the duty-cycle of a driving signal of the transistor M. Naturally, dimensioning of the power components of the converter, switching frequency and duty-cycle, are normally designed for a certain contemplated steady state load level. Therefore the PWM control circuit will reduce or increase the duty-cycle in response to the variations of the load or of the unstabilized supply voltage.

As already mentioned above, an attendant requirement of this or any other types of static converter is the minimization of the energy losses, in order to maintain the conversion efficiency as high as possible. In this context, the diagram of FIG. 3 schematically shows an operation mode normally referred to as "burst mode", which is implemented according to a known technique to reduce the power consumption during operation in a discontinuous mode, that is under conditions of relatively low load level. As may be observed, the switch M is enabled to switch at the switching frequency fixed by the timing signal and according to a duty-cycle controlled by the PWM network, only for brief intervals of time, or, that are defined by the rising of the output voltage of the error amplifier, that is for the whole period of time necessary for the output voltage to reach and rise above a maximum threshold. However, these switching bursts cause corresponding switching losses.

According to the present invention, the energy losses due to these switching bursts may be advantageously eliminated, when conditions permit, by removing the control of the power switch M from the PWM network during this period, and by using instead a direct turn-on and -off control of the power switch in a hysteretic mode. This is achieved by exploiting the signal produced by a common hysteresis comparator.

Figure 4:
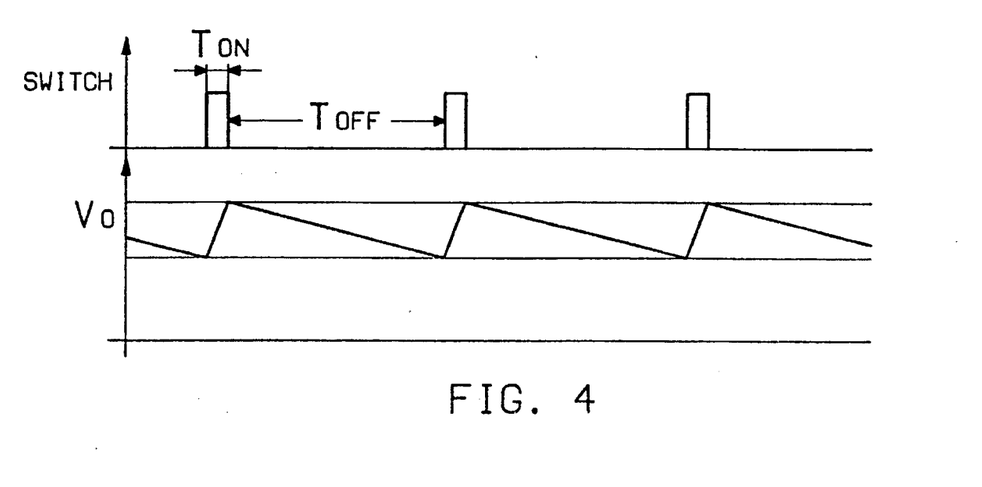
FIG. 4 shows a diagram of a mode of operation with a hysteretic direct control of the switch, during a period of operation at a low load level, as implemented by the circuit of the present invention.

The result is to implement a mode of operation that is depicted in the diagram of FIG. 4, which may be readily compared with the diagram of FIG. 3 of the known system.

Of course, the control circuit must be capable of selecting automatically one or the other mode of control, as a function of the load of the converter. This is implemented by the inventive circuit depicted in FIG. 5.

Figure 5:
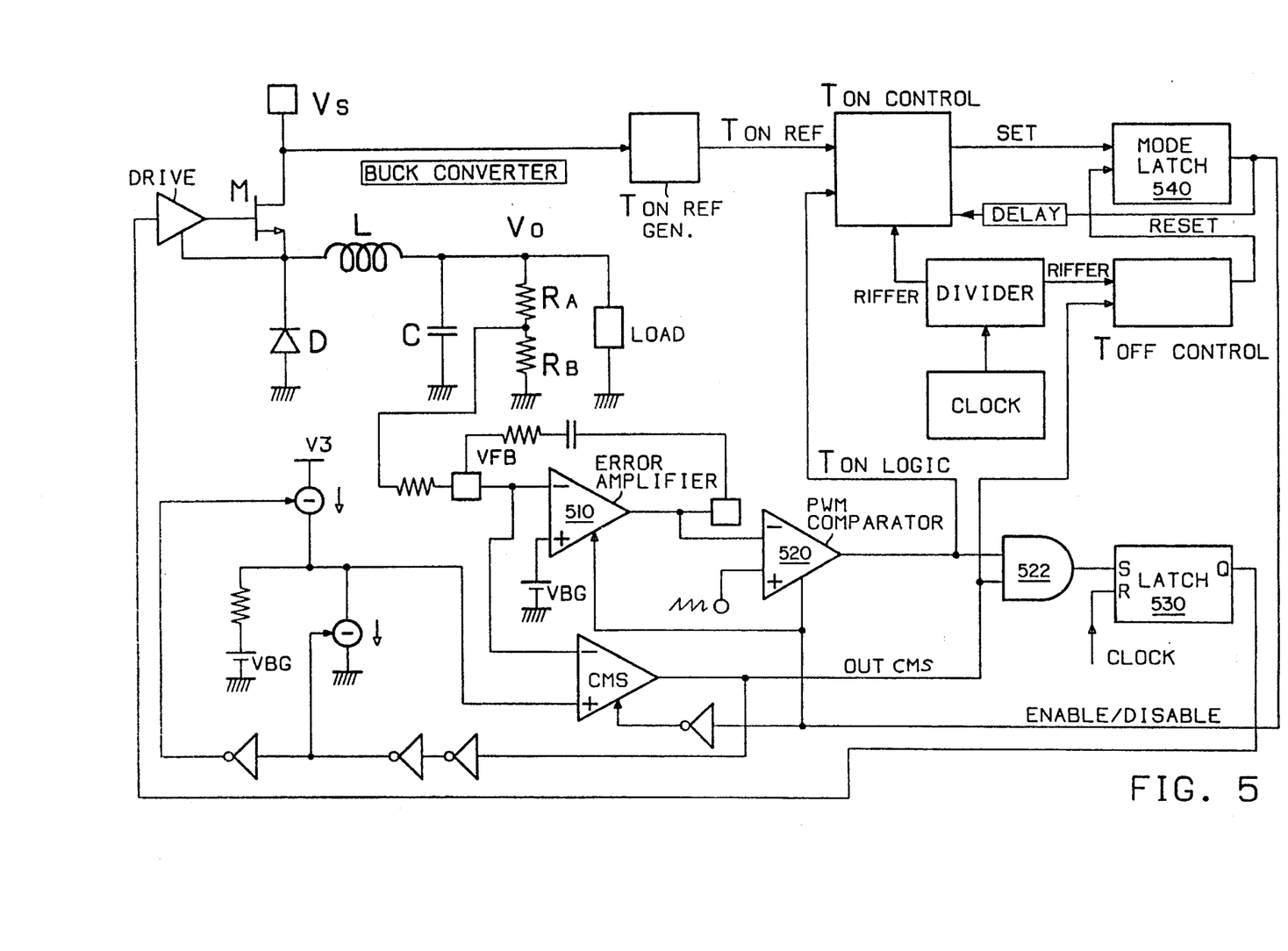
FIG. 5 is a block diagram of a buck converter provided with a circuit for selecting the mode of operation and control according to the present invention.

With reference to FIG. 5, a first PWM control network is composed of an ERROR AMPLIFIER 510 capable of amplifying the difference between a feedback voltage VFB that replicates the output voltage Vo (scaled down by voltage divider RA-RB with a reference voltage VBG (generated e.g. by a bandgap voltage reference, to generate an amplified error signal which is fed to the inverting input of a PWM comparator 520. To the non-inverting input of the PWM comparator 520 is applied a suitable saw-tooth signal of a frequency that can be established by a local oscillator or derived by division from a general clock's frequency.

The PWM comparator 520 outputs a logic signal $T_{ON}$-LOGIC which, through a latch circuit 530, determines the turning-off of the power switch M at a certain instant of the switching period, which is established by a clock signal fed to another input (reset of the latch circuit 530.

A second, voltage threshold, hysteretic control network is composed of a comparator CMS, having an inverting input of which the feedback voltage VFB is applied. A non-inverting input of the comparator CMS is applied a reference voltage which is switched between TWO possible limit values both referred to a constant reference voltage VBG, in dependence on the output state of the CMS comparator. This dependence is implemented by a pair of current generators which are controlled by the comparator's output. This provides hysteretic operation of the comparator CMS, and this in turn provides a hysteretic control of the output voltage Vo, within a range of variation defined by the percentage variation between the two limit values seen at the non-inverting input of the comparator CMS.

The signal produced by the PWM control network and the signal produced by the hysteretic control network are fed to respective inputs of an AND gate, the output of which is connected to the "set" input of the driving latch of the power switch M of the power section of the converter.

An ENABLE/DISABLE logic signal activates/inactivates the PWM control network and the hysteretic control network in a mutually exclusive manner, as depicted in FIG. 5.

Selection of Control Mode

Selection of one or other control mode, as a function of the load level of the converter, is implemented without any need for dissipative sensing devices, such as the sensing resistances sometimes used in the power circuit to sense load current. Basically, the selection occurs by monitoring two duty-cycles. When the PWM control circuit is active, the duty-cycle of the turn-off signal of power switch M is monitored; when the hysteretic control network is active the duty-cycle of the switching signal produced by the hysteretic control network is monitored.

In the first case, during operation with a relatively high load of the converter, the switching duty-cycle, represented by the $T_{ON}$LOGIC signal present at the output the PWM comparator, is compared with a signal representative of a threshold duty-cycle $T_{ON}$REF which is generated for this purpose by a dedicated generating circuit $T_{ON}$REFGEN.

This signal $T_{ON}$REF may be designed to correspond to a predetermined percentage of a nominal design duty-cycle of the converter, for example to a percentage comprised between 30% and 80% of the design duty-cycle, or more preferably to a percentage between 30% and 50% of the designed steady state duty-cycle under normal operating condition. The $T_{ON}$REFGEN generating circuit can be implemented so as to keep constant the fractional duty-cycle corresponding to the threshold duty-cycle signal $T_{ON}$REF, independently of possible variations of the unstabilized supply voltage Vs. In other words, the signal produced may vary with the supply voltage in order to keep constant the preset ratio with the design duty-cycle.

A logic circuit $T_{ON}$CONTROL operates a comparison between the current duty-cycle, represented by the $T_{ON}$LOGIC signal, and the signal $T_{ON}$REF which represents the threshold reference duty-cycle. When the current duty-cycle drops below the reference duty-cycle, the circuit block $T_{ON}$CONTROL activates the SET input of the MODE LATCH 540, the output signal of which ENABLE/DISABLE simultaneously disables the error amplifier 510 and PWM comparator 520, and enables the hysteresis comparator CMS. The hysteresis comparator CMS thereafter assumes direct control of the turn-on and turn-off of the power switch M, through the signal OUT CMS, which is fed through the AND gate 522 to the "set" terminal of the driving latch 530.

The period of time during which the OUT CMS signal maintains the power switch M in an OFF condition ($T_{OFF}$ semi-period of the diagram of FIG. 4, during which a discharge of the output voltage Vo toward the lower threshold of the comparator CMS occurs, is monitored by the $T_{OFF}$CONTROL block.

According to one embodiment, the signal OUTCMS is compared by the $T_{OFF}$CONTROL block with a certain internal reference period of time, which may be provided by a divider of a system's clock or local oscillator frequency, capable of generating a RIFPER signal, which may be used by the $T_{OFF}$CONTROL block as well as by the $T_{ON}$CONTROL block, as a unit of measurement of time intervals (that is as a sampling signal.

When the load conditions increase and the time interval $T_{OFF}$ drops below a certain preset limit, the $T_{OFF}$CONTROL block generates a reset signal for the MODE LATCH 540, whose output signal ENABLE/DISABLE changes state, thus enabling the PWM control network and disabling the hysteretic control network.

At this point the system returns to a normal PWM control condition, and the $T_{ON}$CONTROL block is again ready to detect future reductions of the load below a preset level, which will cause a return of the system to a hysteretic control mode, implemented by the control network functionally constituted by the hysteresis comparator CMS.

According to a preferred embodiment, a certain hysteresis is introduced in controlling the MODE LATCH 540 by the $T_{ON}$CONTROL circuit, to prevent the system passing from a PWM control mode to an hysteretic control mode because of spurious impulses due to momentary load variations.

Figure 6:
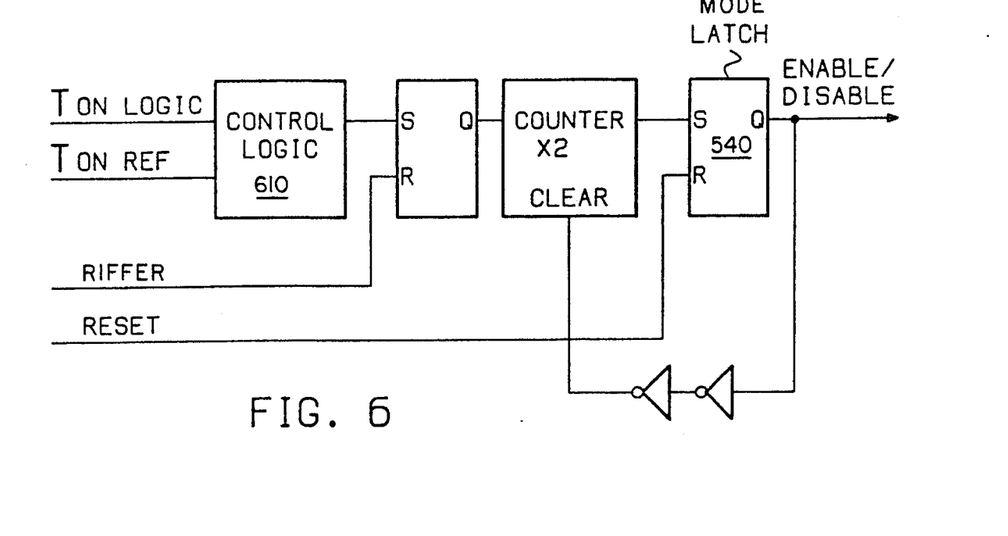
FIG. 6 is a partial block diagram of an embodiment of part of the circuit of the invention.

According to one embodiment, the $T_{ON}$CONTROL circuit which controls the MODE LATCH 540 may be implemented as shown in the partial diagram of FIG. 6. A first logic circuit 610 compares the $T_{ON}$LOGIC and $T_{ON}$REF signals, and the resulting signal is fed to the "set" input of latch 620, which is sampled at a frequency determined by the DIVIDER block, whose output signal is applied to the "reset" terminal of the latch. The output signal is also fed to a COUNTER_x2, whose output activates the "set" input of the MODE LATCH 540.

Figure 9:
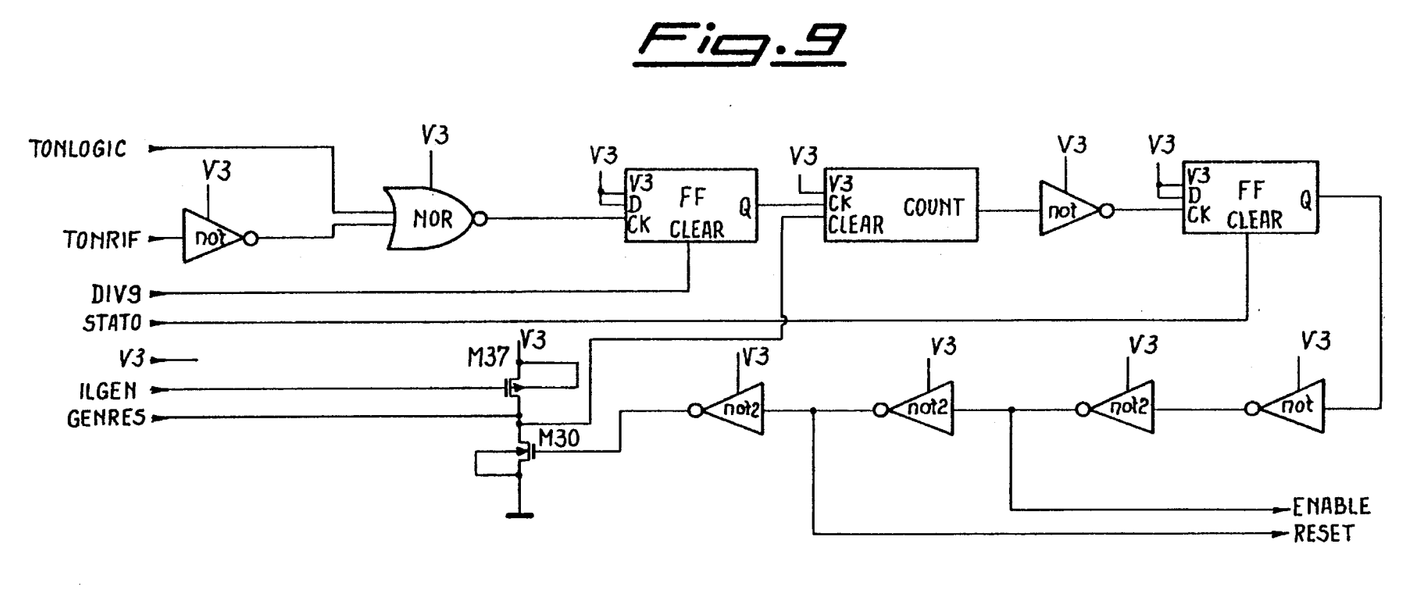
FIG. 9 is a circuit diagram of a portion of the circuit of FIG. 6.

A refresh function is implemented by the delay network, composed by the pair of inverters, through which the COUNTER_x2 is reset after a certain period of time, for example every 20–40 milliseconds, in order to prevent the passage from a PWM control mode to a hysteretic control mode because of spurious impulses at the level of load current absorption. Further details of the circuitry associated with the mode latch 540 (in a sample embodiment are shown in FIG. 9.

Figure 7:
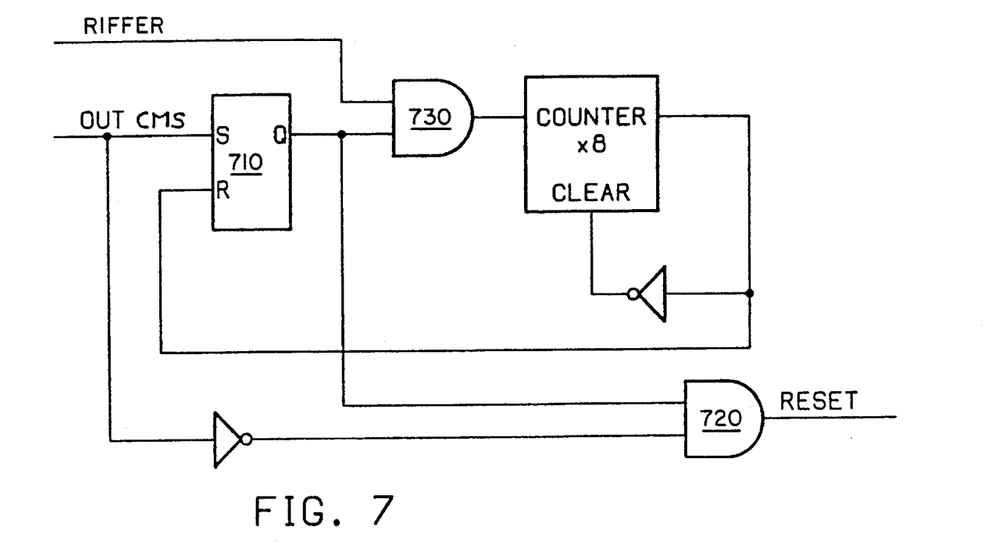
FIG. 7 is a partial block diagram of an embodiment of another part of the circuit of the invention.

As already described above, the output of the MODE LATCH 540 is reset by the signal produced by the $T_{OFF}$CONTROL block, an embodiment of which is depicted in FIG. 7. The OUTCMS signal is fed to a "set" input of a latch 710 and in an inverted form to an input of an AND gate 720 which provides the output of the block. The Q output of the latch is connected to a second input of the output AND gate of the block and to an input of a second AND gate 730, to the other input of which is applied the sampling signal RIFPER provided by the DIVIDER block. The output of the second AND gate is fed to a COUNTER_x8, whose output signal is applied to a "reset" input of the latch 710 and, in inverted form, to the "reset" terminal of the same COUNTER_x8.

Figure 8:
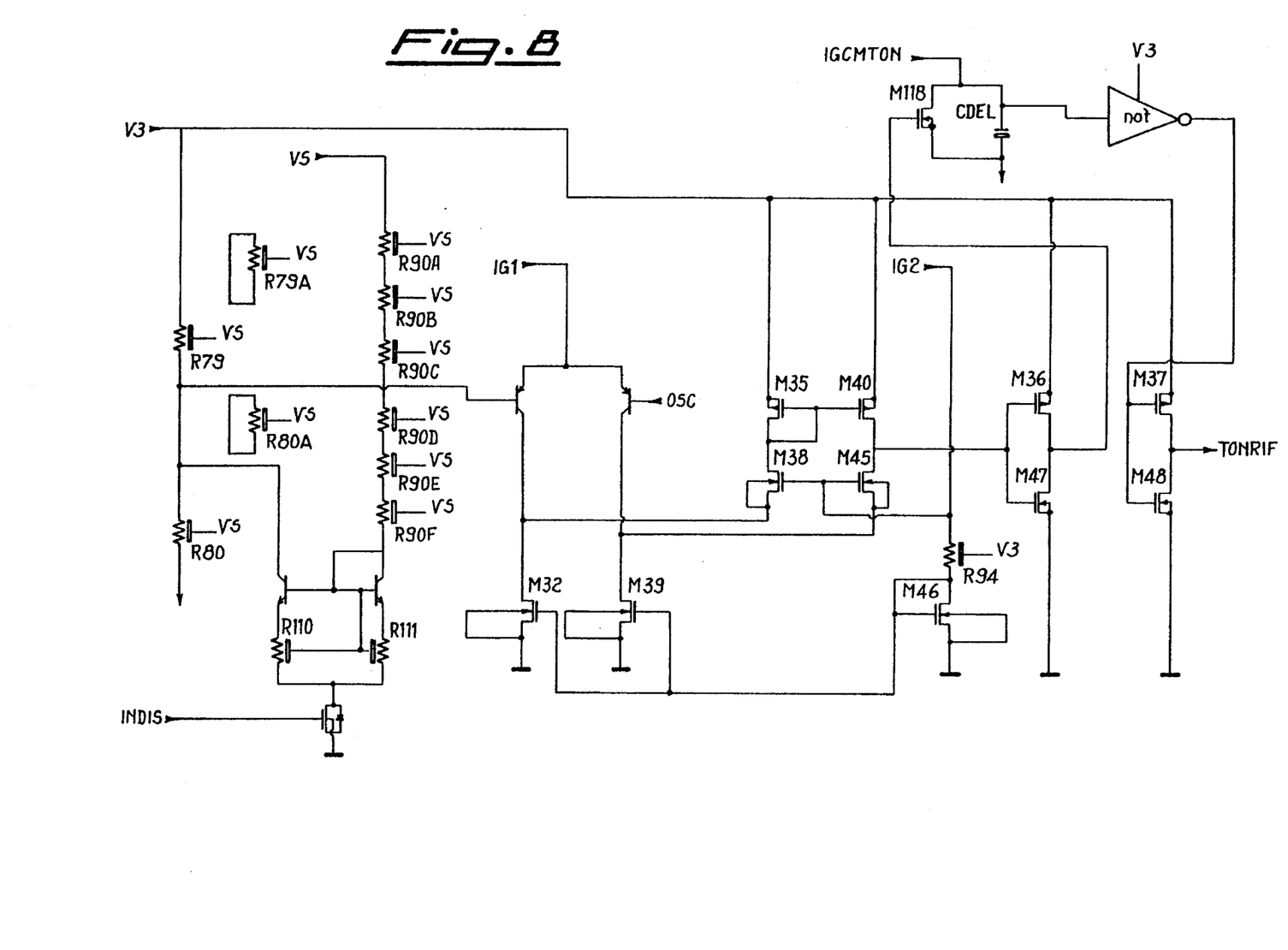
FIG. 8 is a circuit diagram of a generator of a signal representative of a certain functionary duty-cycle as compared with a design duty-cycle, usable in the circuit of the invention.

A circuit diagram for realizing a generator of a signal $T_{ON}$RIF representative of a reference duty-cycle is shown in FIG. 8. To ensure that the reference duty-cycle always corresponds to a certain percentage of a given design duty-cycle (e.g. to 0.4 of the reference duty-cycle $T_{ON}$, the circuit that generates the signal $T_{ON}$RIF may be provided with a compensation network as shown in the example, capable of maintaining the $T_{ON}$RIF signal equivalent to 0.4 $T_{ON}$, independently of eventual variations of the unstabilized supply voltage Vs. Purely with the intent of illustrating a sample embodiment, FIG. 9 shows the detailed implementation of the partial circuit of FIG. 6, that is of the circuit block for detecting a condition of light load and for transferring the control of the converter to the hysteretic control network, by the ENABLE signal.

Figure 10:
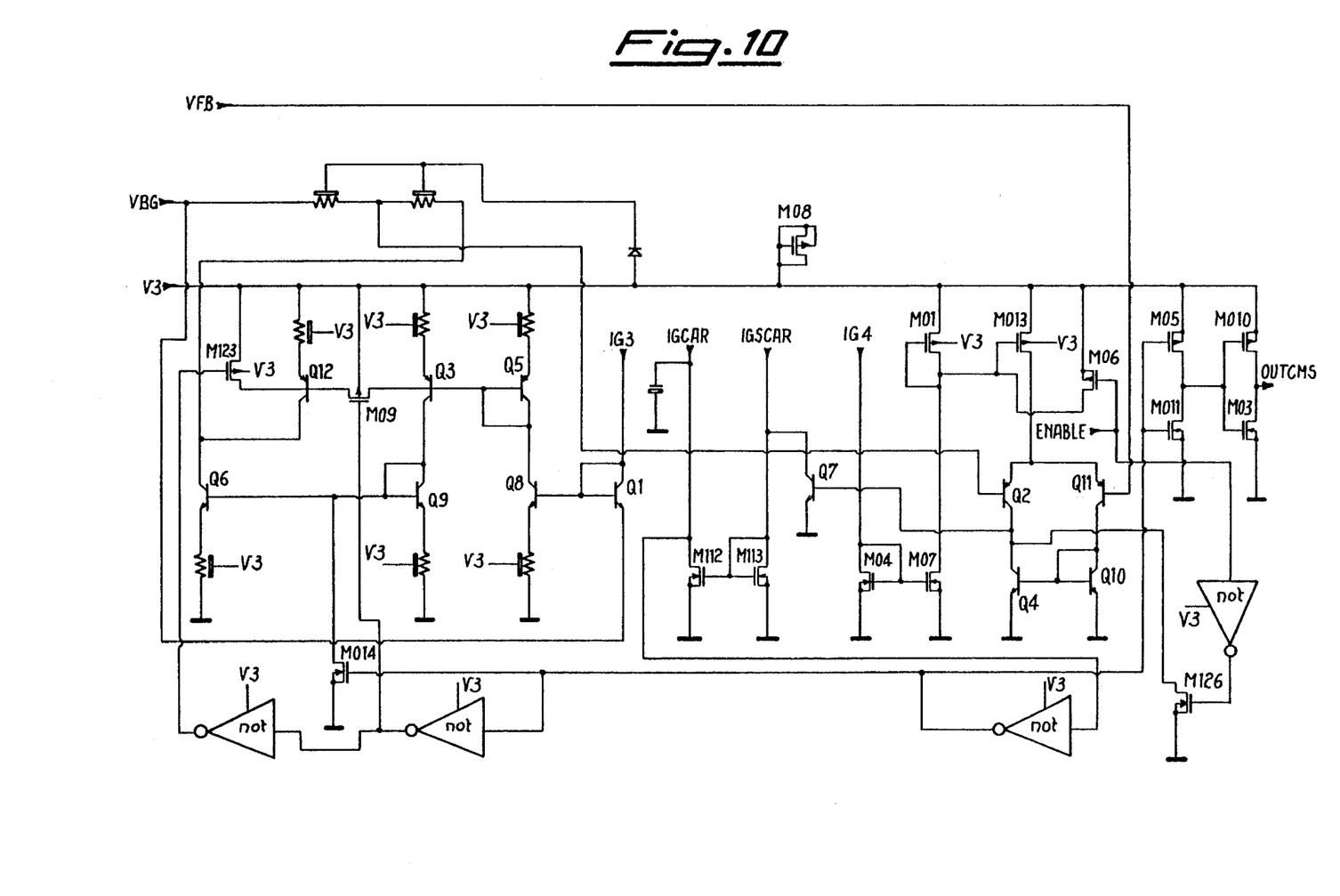
FIG. 10 is a circuit diagram of the portion of the circuit of the invention of FIG. 7.
Figure 11:
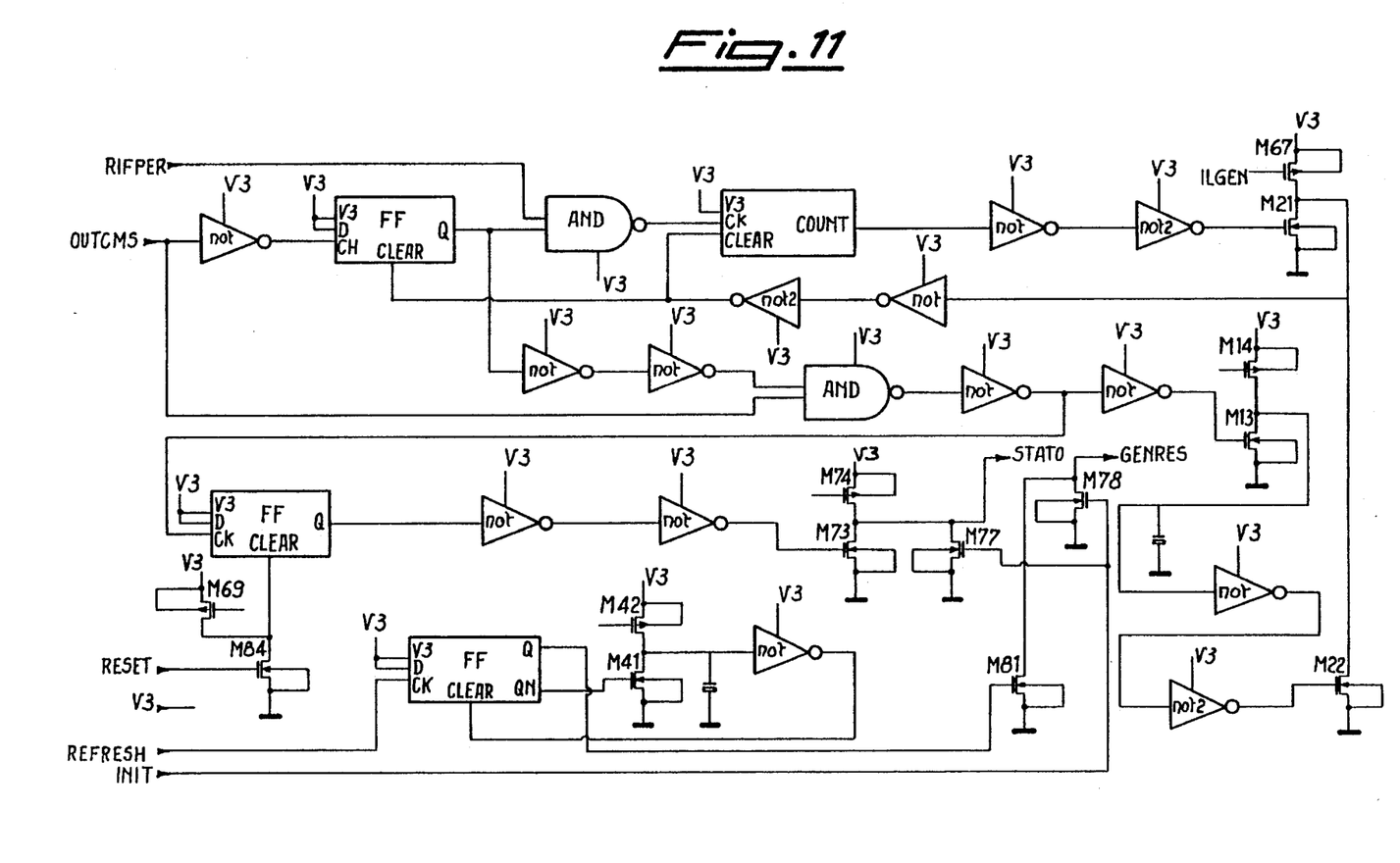
FIG. 11 is a circuit diagram of a hysteresis comparator usable in the inventive circuit of FIG. 5.

A complete circuit diagram of an embodiment of a CMS hysteresis comparator, usable in the circuit of the invention of FIG. 5 is shown in FIG. 10. Finally, a detailed circuit diagram of an embodiment of the $T_{OFF}$CONTROL block in the circuit of FIG. 5 is shown in FIG. 11.

It should be noted that FIGS. 8 to 11 show practical circuit diagrams produced by CAD simulation. A detailed description of these sample circuits of one embodiment of the inventive circuit is deemed superfluous in the present context, in view of the fact that a skilled technician will be perfectly able to read these circuit diagrams and to reduce them to practice without any difficulty. The inclusion of such detailed information of a practical example of realization of the circuit of the invention must be understood to be intended purely for illustrative purposes, and not as a limitation of the invention, which may be implemented also in other innumerable different circuit forms and which is intended to be defined by the following claims.

As will be recognized by those skilled in the art, the innovative concepts described in the present application can be modified and varied over a tremendous range of applications, and accordingly the scope of patented subject matter is not limited by any of the specific exemplary teachings given.

What is claimed is:

1. A DC-to-DC converter having a power section comprising
   - a switch having a first node and a second node and capable of switching at a frequency established by a timing signal;
   - an output buffer capacitor coupled between said second node and a reference potential;
   - a recirculation diode coupled between said second node and said reference potential;
   - a control and voltage stabilization section coupled between said second node and a control terminal of said switch comprising
     - a first control loop having an error amplifier coupled to said second node and a PWM control comparator coupled to said error amplifier for controlling the duty-cycle of said switch in function of the output voltage,
     - a second control loop having a threshold comparator coupled to said first control loop for controlling the turning-on and turning-off of said switch in function of the output voltage; and
   - means for monitoring the load level of the converter, for disabling said first control loop and enabling said second control loop when the load level of the converter drops below a preset threshold, and for enabling said first control loop and disabling said second control loop when the load level rises above a preset threshold.

2. The converter of claim 1, wherein said preset thresholds of the level of load are implemented without using sensing resistances of the output current by establishing a reference duty-cycle that is comparable with the current duty-cycle.

3. The converter of claim 2, wherein said reference duty-cycle has a value comprised between 30% and 80% of a steady state duty-cycle of the converter in a continuous mode of operation under control of said first control loop.

4. A DC-to-DC static converter comprising
   - a power section having a control node and an output node that includes at least a switch capable of switching at a frequency set by a clock signal, a storing capacitor, a recirculation diode;
   - a control and output voltage stabilization section coupled between said control node and said output node which comprises
   - a first control loop that includes an error amplifier having an input coupled to said output node and a PWM control comparator coupled to said error amplifier and capable of controlling the duty-cycle of said switch in function of the output voltage;
   - a driving circuit of said switch comprising a logic AND gate coupled PWM comparator, receiving through a first input a first logic signal output by said PWM control comparator and having an output connected to a set input of a first latch circuit having a reset terminal to which said clock signal is applied, the output signal of the latch circuit controlling the state of said switch;
   - a first logic circuit capable of generating a second logic signal representative of a reference duty-cycle;
   - a second logic circuit capable of comparing said second logic signal and a first logic signal representative of the current duty-cycle of the converter and generating a third, logic set signal for a second mode latch, the output signal of which enables or disables said error amplifier and said PWM comparator when the current duty-cycle drops below said reference duty-cycle;
   - a hysteresis comparator, coupled to and enabled by said error amplifier and PWM comparator disabling signal, capable of generating a fourth logic signal for turning on and turning off said switch, which is applied to a second input of said AND gate, in function of the dropping of the output voltage of the converter below a first preset minimum reference threshold or of the rising of the output voltage of the converter above a second preset maximum reference threshold; and
   - a third logic circuit capable of determining the duty-cycle of said fourth signal produced by said threshold comparator and generating a fifth logic signal for resetting said second mode latch when the duty-cycle of said fourth logic signal is above a preset threshold thus enabling said error amplifier and said PWM comparator and disabling said comparator.

5. The converter of claim 4, wherein said first logic signal generates a signal representative of a reference constant duty-cycle, which varies with the varying of the supply voltage.

6. The converter of claim 4, wherein said second logic circuit has means for producing a certain hysteresis in the change of state of said third logic signal that sets said second mode latch.

7. A DC-to-DC converter comprising
   - a power switch capable of intermittently connecting a first terminal of an inductor to a supply node wherein a second terminal of said inductor is connected to a terminal of an output capacitor;
   - a PWM control network connected to control said power switch;
   - a hysteresis control network connected to control said power switch;
   - circuitry connected to monitor the duty cycle of the signal controlling said power switch and to give control of said power switch to said PWM control network when said duty cycle is greater than a preset value and to give control of said power switch to said hysteresis control network when said duty cycle is less than said preset value.

8. A method of controlling a DC-to-DC converter comprising the steps of
   a. controlling a power switch of said DC-to-DC converter in a mutually exclusive manner by driving signals generated by a PWM control loop and a hysteretic control loop respectively;
   b. monitoring dynamically the load level of said power switch
   c. comparing said load level to a preset value;
   d. enabling said PWM control loop and disabling said hysteretic control loop when said load level is greater than said preset value; and e. enabling said hysteretic control loop and disabling said PWM control loop when said load level is less than said preset value.

9. The method of claim 8 wherein the step of controlling said DC-to-DC converter is effected by comparing the duty-cycle of said driving signal of the currently active control loop with a reference value.

10. The method of claim 8 wherein said preset value has a value comprised between 30% and 80% of a steady state duty-cycle of the converter in a continuous mode of operation under control of said first control loop.

* * * * *

UNITED STATES PATENT AND TRADEMARK OFFICE
CERTIFICATE OF CORRECTION

PATENT NO. : 5,617,016
DATED : April 1, 1997
INVENTOR(S) : Maria R. Borghi and Paolo Sandri It is certified that error appears in the above-identified patent and that said Letters Patent is hereby corrected as shown below:

In Column 7, Claim 4, Line 64, following "coupled", please insert --to said--.

Signed and Sealed this

Thirtieth Day of December, 1997

Attest:

BRUCE LEHMAN

Attesting Officer

Commissioner of Patents and Trademarks